United States Patent [19]

Dohany

[11] 4,076,929

[45] Feb. 28, 1978

[54] VINYLIDENE FLUORIDE POLYMER HAVING IMPROVED MELT FLOW PROPERTIES

[75] Inventor: Julius Eugene Dohany, Berwyn, Pa.

[73] Assignee: Pennwalt Corporation, Philadelphia, Pa.

[21] Appl. No.: 627,481

[22] Filed: Oct. 30, 1975

[51] Int. Cl.² .............................................. C08F 14/22
[52] U.S. Cl. .............................. 526/255; 204/159.17; 252/66; 428/500; 526/249; 526/253; 526/254
[58] Field of Search ...................... 260/92.1, 87.5 A; 204/159.17; 526/249, 253, 254, 255

[56] References Cited

U.S. PATENT DOCUMENTS

| | | | |
|---|---|---|---|
| 3,012,021 | 12/1961 | Hauptschein | 260/92.1 |
| 3,051,677 | 8/1962 | Rexford | 204/159.17 |
| 3,193,539 | 7/1965 | Hauptschein | 260/92.1 |
| 3,269,862 | 8/1966 | Lanza et al. | 204/159.17 |
| 3,780,007 | 12/1973 | Stallings | 260/92.1 |
| 3,781,265 | 12/1973 | Dohany | 260/92.1 |
| 3,836,514 | 9/1974 | Fechillas | 260/86.1 E |
| 3,857,827 | 12/1974 | Dohany | 260/92.1 |

*Primary Examiner*—Harry Wong, Jr.

[57] ABSTRACT

A high molecular weight vinylidene fluoride polymer resin having improved melt flow properties and further characterized as having a bimodal molecular weight distribution, as measured by gel permeation chromatography, and a specified critical shear stress.

8 Claims, No Drawings

VINYLIDENE FLUORIDE POLYMER HAVING IMPROVED MELT FLOW PROPERTIES

Vinylidene fluoride polymer resin is an electrical insulating material which serves in a variety of applications including primary insulation on wire used in computers, and as jacketing in aircraft wire and geophysical cable. This resin is used as primary insulation on hookup wire employed in computer back panels because it requires not only satisfactory electrical properties, but also exceptional physical toughness.

The use of vinylidene fluoride polymer resin in the form of heat shrinkable tubing is growing rapidly. This non-burning, semi-rigid insulation offers superior resistance to most industrial fuels, solvents and chemicals, and is designed for applications requiring high mechanical strength at temperatures ranging to 175° C. Shrinkable tubing is used for so-called "solder sleeves" since it will not split when shrunk over sharp or irregular shapes and is employed extensively in the electronics, aircraft and aerospace industries.

Vinylidene fluoride polymer resins presently on the market are being extruded at modest speeds, up to 550 feet per minute. The natural desire of wire and cable manufacturers, and other users of such materials, is to process such resins at higher speeds in order to achieve optimum productivity.

A need for vinylidene fluoride polymer resin having improved properties is also of importance in the chemical processing equipment field. This includes vinylidene fluoride polymer piping systems, both lined and solid, and a variety of solid lined valves and pumps. In addition, vinylidene fluoride polymer films and flexible sheets are used as valve diaphragms and for packaging of corrosive materials. Special devices including spargers, dutchman, large diameter ducts, tower packing, and filter cloth woven from vinylidene fluoride polymer monofilament are articles which are prepared from pressure molded or extruded resin.

It is a primary object of this invention to provide a high molecular weight vinylidene fluoride polymer resin which has improved properties. It is another object to provide an extrusion grade vinylidene fluoride polymer resin which has improved melt flow characteristics whereby it may be readily melt processed at higher speeds.

These and other objects are attained in accordance with this invention which is a high molecular weight vinylidene fluoride polymer resin having a distinct bimodal molecular weight distribution, as indicated by gel permeation chromatography, and a critical shear stress of at least 3 million dynes/square centimeter.

The vinylidene fluoride polymer of this invention is preferably a homopolymer but copolymers of at least about 75 mol percent of vinylidene fluoride and at least one other monomer copolymerizable therewith are included. Specifically, the comonomer is halogenated ethylene, halogenated propylene, halogenated butylene or combinations thereof. Preferred comonomers include tetrafluoroethylene, chlorotrifluoroethylene, trifluoroethylene, hexafluoropropene and pentafluoropropene.

A number of prior art references may be referred to which show resins of this general type including: U.S. Pat. Nos. 3,193,539; 3,311,566; 3,475,396; 3,598,797; 3,640,985; 3,708,463; and 3,857,827.

A surprising aspect of this invention is the excellent melt flow behavior of the high molecular weight polymer which is due to its broad molecular weight distribution. The excellent melt flow characteristics of the vinylidene fluoride polymers of this invention may be gauged by determining the critical shear stress, i.e., critical shear rate at which melt fracture will occur. The critical shear stress and apparent melt viscosity of the polymer, both indicators of melt processability, were measured by the Sieglaff-McKelvey Capillary Rheometer (product of the Tinius-Olsen Testing Machine Company, Willow Grove, Penna.) with a capillary having a flat entry and an L/D (i.e., length over diameter) of 26 at 232° C. The apparent melt viscosities of the vinylidene fluoride polymer resins of this invention range from about 20,000 to 50,000 poise, preferably from about 25,000 to 35,000 poise at 100 reciprocal seconds shear rate. If the shear rate and shear stress, respectively, are increased then the extrudates from the above capillary remain smooth up to a shear stress of at least $3.0 \times 10^6$ dynes/cm$^2$, preferably at least $4 \times 10^6$ dynes/cm$^2$ and, more preferably at least 5 million dynes per square centimeter.

The molecular weight and distribution was measured by gel permeation chromatography (hereinafter referred to as GPC). The method is described by R. L. Bartosiewicz, J. Paint Tech. 39, 28 (1967). The GPC analysis was carried out at 80° C with a GPC Model 200 (product of Waters Associates, Inc., Framingham, Mass.) equipped with Porasyl Columns, and using N,N-dimethylacetamide as the solvent. The polymers produced herein have a GPC molecular weight average ($A_w$) from about 300,000 to 700,000, and a GPC molecular number average ($A_n$) from about 5,000 to 30,000. The Angstrom number average ($A_n$) and the Angstrom weight average ($A_w$) were computed in standard fashion.

While some other vinylidene fluoride polymers are known to have apparent bimodal molecular weight distribution, the polymers of this invention have a distinct bimodal arrangement. The size and area of the high molecular weight spike is particularly important to characterize the polymers of this invention. The high molecular weight spike is usually located at the GPC (gel permeation chromatography) count number from about 14 to 20, preferably from about 14 to 18. The integrated area under the high molecular weight spike (i.e., high molecular weight fraction) is generally more than about 30 up to about 70 percent of the total area under the GPC curve (total area = total polymer), preferably from about 45 to 70 percent, and the high molecular weight spike is generally in the range of more than about 30 up to 70 percent, preferably at least about 45 percent by weight on the entire polymer. The polymers of the prior art either don't have any high molecular weight spike or, if there is any, it represents generally about 30 weight percent of the total polymer or less. The presence of this high molecular weight spike has been found to be particularly desirable for good melt processing characteristics at high shear rates. Vinylidene fluoride polymers having bimodal molecular weight distribution including high molecular weight spikes somewhat above 30 weight percent of the total polymer may be prepared in accordance with the general teachings of U.S. Pat. No. 3,193,539, i.e., using a single initiator charge (slug), or by polymer blending, i.e., mixtures of high and low molecular weight polymers, but such polymers do not or will not simultaneously have the critical shear stress property of the resin of this invention.

The polymers of this invention are prepared in accordance with a method broadly alluded to but not specifically set forth in U.S. Pat. No. 3,193,539. Generally described, the high molecular weight vinylidene fluoride polymers of this invention are prepared by polymerizing vinylidene fluoride monomers with or without copolymerizable comonomers, in an aqueous medium containing a fluorosurfactant, a conventional organic peroxide initiator suitable for vinylidene fluoride polymerization, preferably ditertiary butyl peroxide and, optionally, wax to stabilize the emulsion. The initiator is fed incrementally to the aqueous reaction medium simultaneously with the incremental addition of the monomer.

The initial step in the polymerization technique is to charge to the reactor the water used as the reaction medium, preferably deionized water, the amount thereof ranging from about 186 to about 900 parts per hundred parts of monomer. A conventional fluorosurfactant is mixed in the water in an amount within the range of about 0.05 to 0.5 percent, preferably from 0.08 to 0.2 percent based on the weight of the total monomer ultimately charged to the reactor.

Representative of fluoroalkyl surfactants suitable as vinylidene fluoride polymer emulsion stabilizers in this process are those described in U.S. Pat. No. 2,559,752, e.g. acids of the formula $X(CF_2)_nCOOH$ where $n$ is an integer from 6 to 20, X is hydrogen or fluorine, and the alkali metal, ammonium amine, and quaternary ammonium salts thereof; phosphoric acid esters of polyfluoroalkanols, of the formula $X(CF_2)_nCH_2OPO(OM)_2$ where X is hydrogen or fluorine, $n$ is 5 to 10, and M is hydrogen, alkali metal, ammonium, substituted ammonium (e.g. alkyl amine of 1 to 4 carbon atoms) or quaternary ammonium, sulfuric acid esters of polyfluoroalkanols of the formula $X(CF_2)_nCH_2OSO_3M$ where X and M are as above; the acids described in U.S. Pat. No. 3,232,970 of the formula

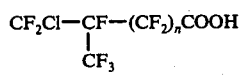

where $n$ is an integer of 3 to 9, and the metal salts, ammonium salts, and acyl halides of said acids, the acids and salts thereof described in U.S. Pat. No. 3,311,566 and mixture thereof, of the formula $ZC_nF_{2n}COOM$ where Z is fluorine or chlorine, $n$ is an integer of 6 to 13, and M is hydrogen, alkali metal, ammonium, or lower alkyl substituted ammonium. The foregoing surfactants are meant to be illustrative of and not exclusive of fluoroalkyl surfactants, many others of which are known in the art and are operable as dispersion stabilizers in the emulsion polymerization of vinylidene fluoride polymers.

As is usual in vinylidene fluoride polymerization, before introduction of the monomer the reactor is subjected to a series of evacuations and nitrogen purges to insure an oxygen-free environment for the polymerization. Optionally, before introduction of the monomer, the reactor can be deaerated with a "boil-out" procedure during which the aqueous charge in the reactor is heated to 100° C while agitating. Once the aqueous charge is boiling, the agitation is stopped and the steam and air are vented off. After about 1 to 10 minutes, the reactor is sealed and agitation continued. Both methods are essentially equivalent and important for the successful start of the polymerization reaction.

The reactor is then heated to the desired reaction temperature and pressurized with the vinylidene fluoride monomer to the operating pressure with agitation on.

The process is operable at pressures of from 300 to 1,000 psig, preferably from 500 to 700 psig. The pressure is maintained for the duration of the polymerization run by the incremental monomer feed. The reaction may be pursued at the end of the run (after the total of the monomer has been fed) down to pressure of about 150 psig in order to increase the ultimate yield of polymer.

Upon completion of the reaction the reactor is cooled to 90° C, the agitation is stopped, residual monomer is vented, and the aqueous emulsion containing the vinylidene fluoride polymer is then recovered from the reactor; generally, this latex contains from about 10 to about 35 weight percent polymer solids. The particle size of the polymer in the latex is in the form of small spheres in the size range from about 0.1 to 1.0 micron, preferably from about 0.2 to 0.5 micron. The reactor latex is then coagulated, washed and dried by well known methods in the art or stabilized and concentrated, for use in water-based coating preparations.

The temperature range of the polymerization process is 115 to 135° C and preferably from 120 to 130° C. Once the operating temperature and pressure is attained, the initiator (preferably di-tertiary butyl peroxide, hereinafter referred to as DTBP) is fed incrementally or substantially continuously to the reactor together with simultaneous incremental or substantially continuous feed of the monomer through another inlet.

In general, the DTBP concentration is chosen to provide for the desired molecular weight of the polymer. More explicitly, the amount of DTBP used is in the range of about 0.1 to about 1.5 weight percent, preferably from 0.5 to 0.9 weight percent based on the total weight of monomer ultimately fed to the polymerization reactor.

The incremental addition of DTBP is essential to regulate the molecular weight distribution and is critical to the success of the process which is to provide vinylidene fluoride polymer with improved melt flow characteristics. More explicitly, to regulate the molecular weight distribution of the polymer, from about 3 to 1 weight fractions, preferably 2 weight fractions, of DTBP are fed to the polymerizer for each weight fraction of vinylidene fluoride monomer incrementally fed to the same polymerizer. Hence, at the conclusion of the DTBP addition the amount of monomer fed to the polymerizer will be from about 25 to 100% preferably about 50% of total monomer feed.

The following specific examples are set forth to demonstrate the preparation and properties of the polymer of this invention.

EXAMPLE 1

In each of a series of eight runs a 2 gallon horizontal, stainless steel autoclave equipped with a four blade paddle agitator was charged with 5363 ml. of deionized water, 187 ml. of a 1 percent aqueous solution of fluorosurfactant (the ammonium salts of a mixture of fluorotelomer acids $(CF_3)_2CF(CF_2CF_2)_nCF_2COOH$, were $n$ is 2 or 3, and 3 grams of paraffin wax having a melting point of 191° F (a conventional latex stabilizer used to aid in inhibiting coagulation and adhesion of polymer to the reactor walls, sold under the mark "Arcowax 191" by Atlantic Richfield Company); this wax additive was helpful, but not essential to carrying out the process of this invention.

Agitation was started and the reactor content was heated to 100° C; agitation was stopped, and steam was vented for approximately 3 minutes. The reactor was then sealed, agitation resumed and temperature increased to 125° C and then pressurized to 650 psig by the addition of from 198 to 255 gm. of vinylidene fluoride monomer, which amount was 10.6 to 13.6 weight percent of the total monomer ultimately fed to the reactor. At this point 3.5 to 4.5 ml. equivalent to 2.76 to 3.54 gm. DTBP was fed to the reactor with a positive displacement pump which was 1.4 weight percent of the initial monomer charge or 2 weight fractions of DTBP for each weight fraction of monomer fed to the reactor.

Initiation of the polymerization reaction occurred in about 13–17 minutes signified by a 10 psig pressure drop on the pressure recorder. Continuous feeding of monomer was resumed to maintain the reaction pressure at 650 psig and the rate of initiator injection was maintained at a rate of 2 weight fractions of DTBP for each weight fraction of monomer fed. The feed of DTBP was stopped when 935 gm. of monomer is fed which was 50% of the total monomer to be added to the reaction. At this point the total consumption of DTBP wax 16.5 or 13.1 gm. which was 0.7% by weight of the total monomer charge. After the DTBP injection was stopped, the monomer feed was continued with a total of 1870 gm. of vinylidene fluoride monomer being fed over a total feed time of from 2.82 to 3.58 hours. At this point, the reaction pressure was reacted down to 150 psig within about 16 minutes and the reactor cooled to 90° C. The agitation was stopped, the reactor contents cooled to 60° C, residual monomer vented, and the latex product drained from the reactor. The latex contained from 23.87 to 25.42 weight percent polymer solids, a total of from 1686 to 1825 gm. of polymer, equal to a yield of 90.2 to 95.6 percent. The vinylidene fluoride polymer recovered from the latex of the eight runs had the following characteristics:

| Property | Minimum | Maximum | Average |
|---|---|---|---|
| GPC Weight Average ($A_w$) | 374,000 | 505,000 | 439,000 |
| GPC Number Average ($A_n$) | 10,000 | 17,000 | 13,000 |
| High Mol. Weight Spike, % | 24.2 | 41.7 | 34.0 |
| Critical Shear Stress, dynes/cm$^2$ | $1.21 \times 10^6$ | $5.52 \times 10^6$ | $3.66 \times 10^6$ |
| Melt Viscosity, poise | 27,725 | 30,705 | 38,930 |

Samples from each of the runs were then melt worked with a Brabender plastograph (Brabender Corp., New Rochelle, N.Y.) at 50 rpm, 225° C and 10 minutes to simulate extrusion and then retested on the Sieglaff-McKelvey Capillary Rheometer. The flow characteristics of the eight samples were as follows:

| Property | Minimum | Maximum | Mean |
|---|---|---|---|
| Critical Shear Stress, dynes/cm$^2$ | $3.74 \times 10^6$ | $5.58 \times 10^6$ | $4.99 \times 10^6$ |
| Melt Viscosity, poise | 23,739 | 29,647 | 26,796 |

EXAMPLE 2

A series of six polymerization runs were carried out following the procedure of Example 1 except that the reactor was a 10 gallon horizontal autoclave equipped with paddle agitator which required somewhat modified charges as follows: The reactor was charged with 27.99 liters of deionized water, 6 g. Arcowax 191 and 1010 ml. of a 1 percent aqueous solution of the fluorosurfactant of Example 1. The initial charge of the monomer was from 992 to 1106 gm. which was from 9.5 to 11.0% of the total monomer charge to be fed and from 14 to 16 ml. or from 11.06 to 12.64 gm. DTBP equal to 1.11 to 1.14 weight percent of the initial monomer charge. Initiation of the polymerization reaction occurred in about 12 to 20 minutes signified by a 10 psig pressure drop on the pressure recorder. The rate of DTBP injection was the same as in Example 1. The feed of DTBP was stopped when 5050 gm. monomer was fed which was 50% of the total monomer to be added to the reaction. Total consumption of DTBP was 56.56 gm. or 71.24 ml. which was 0.56 percent by weight of the total monomer charge.

Total monomer feed was 10.1 kg. vinylidene fluoride monomer. Total monomer feed time was from 3.2 to 3.6 hours. The latex contained from 23.8 to 24.3 weight percent polymer solids, representing a total polymer weight of from 9055 to 9210 gm. equal to a yield of 89.6 to 91.2 percent. The polymer produced from the six runs had the following properties:

| Property | Minimum | Maximum | Average |
|---|---|---|---|
| GPC Weight Average ($A_w$) | 614,000 | 693,000 | 656,000 |
| GPC Number Average ($A_n$) | 9,000 | 29,000 | 14,000 |
| High Mol. Weight Spike, % | 46 | 52 | 50 |
| Critical Shear Stress, dynes/cm$^2$ | $5.22 \times 10^6$ | $5.40 \times 10^6$ | $5.26 \times 10^6$ |

The following example is set forth to demonstrate the preparation of a vinylidene fluoride polymer substantially in accordance with the method of the examples of U.S. Pat. No. 3,193,539, and the resulting properties thereof.

EXAMPLE 3

The 2 gallon autoclave of Example 1 was charged with 5365 ml. deionized water, 3 g. Arcowax 191, and 185 ml. of a 1 percent solution of the fluorosurfactant of Example 1. The reactor was sealed, evacuated, purged with nitrogen and the vacuum broken with some vinylidene fluoride monomer to slightly above atmospheric pressure. Agitation and heating of the reactor contents was started. While heating was in progress, the reactor was pressurized with vinylidene fluoride monomer.

When the reaction temperature of 125° C was reached, the monomer pressure was 500 psig. At this point 14.25 gm. or 17.95 ml. DTBP was injected into the reactor with the monomer being fed to the reactor. The initial monomer charge was 269 gm. to attain pressure of 650 psig. Initiation of the reaction occurs within 34 minutes signified by a 10 psig drop on the pressure controller. Pressure was maintained by feeding additional monomer. A total of 1850 gm. monomer was fed within 2.78 hours. At this point, the reaction pressure was reacted down to 150 psig, the reactor cooled to 90° C, agitation stopped and the reactor contents cooled to 60° C, residual monomer vented, and the latex product drained from the reactor. The latex contains 25.3 wt.% polymer solids, a total of 1850 gm. polymer equal to a yield of 99%. The polymer thus produced had the following properties:

| Property | |
|---|---|
| GPC Weight Average ($A_w$) | 270,000 |
| GPC Number Average ($A_n$) | 7,600 |
| High Mol. Weight Spike, % | 18.2 |
| Critical Shear Stress, dynes/cm$^2$ | $1.49 \times 10^6$ |
| Melt Viscosity, poise | 42,100 |

The above is a typical example of a laboratory operation of the process whereby DTBP initiator is added as a slug at the beginning of the reaction. It is, therefore, in accordance with the examples of the disclosure of U.S. Pat. No. 3,193,539.

Crystallization kinetics measurements for the resin typical of this invention were carried out with a Perkin Elmer Differential Scanning Calorimeter Model 1B. A scan rate of 10° C/min. was used for melting point determinations. The crystallization rate data were obtained by first removing the samples crystalline memory with a heat treatment at 200° C for 10 minutes and then allowing it to cool to the desired crystallization temperature where the sample was thereafter isothermally crystallized. The fraction crystallized, obtained from the cumulative area under the DSC exotherm curve, was plotted versus time. The linear portions of the resulting sigmoidal curves were used to calculate crystallization rate.

An Arrhenius plot of crystallization rate versus temperature was made for various vinylidene fluoride polymer samples including the polymer of this invention. The polymer of this invention shows the slowest rate of crystallization compared to the other samples. The crystallization of vinylidene fluoride polymer is obviously very much temperature dependent. Since the total crystallization rates are determined by both nucleation and growth rate, then either or both have to be lower for the polymer of this invention to give the effect shown in the Arrhenius plot. Slower crystal growth and slower nucleation will contribute to less internal stresses in the polymer. The practical implications of this phenomenon should be obvious to the user skilled in this art.

In 1962 Timmerman et al., J. Applied Polymer Sci., 6 (22), 456, have shown that vinylidene fluoride polymer can be radiation crosslinked without detrimental effects to its physical properties.

Irradiation of melt pressed samples was carried out by passing them through an electron beam source of beta radiation. Dose levels of 5 through 60 megarads (Mrads) were evaluated. The higher dosages were obtained by subjecting the sample to successive 5 Mrad increments until the desired dose levels were obtained. Gel fraction data was obtained by successive extractions of the irradiated sample in refluxing dimethyl acetamide. The residue was dried at 80° C to constant weight.

The gel fractions remaining after dimethylacetamide extraction was plotted as a function of radiation dosage. The data were fitted to the Arrhenius plot exponential:

$$G = Ae^{-B/d}$$

where G is gel fraction, $d$ the radiation dose and A and B are empirical constants.

The vinylidene fluoride polymer of this invention shows a very rapid change in network structure. It crosslinks more efficiently than other samples of vinylidene fluoride polymers with which it was compared. It is known from crosslinking studies on polyethylene that crosslinking efficiency is dependent upon crystallinity and chain length. Therefore, the crystallization studies and GPC data suggest that the irradiated polymers behave in a predictable way. That is, the more crystalline and shorter the chain the smaller will be the resulting crosslinking density and vice versa. The vinylidene fluoride polymer of this invention has the largest Angstrom number average and lowest crystallinity compared to the other polymer samples. Hence, its highest crosslinking efficiency for non-activated systems, i.e., compounds not containing radiation sensitizers.

Thus, by careful control of the molecular weight and molecular weight distribution during preparation of the material, an improved vinylidene fluoride polymer results which has been shown to have superior melt extrusion characteristics.

What is claimed is:

1. A high molecular weight vinylidene fluoride polymer resin which is a homopolymer or a copolymer of at least 75 mol percent vinylidene fluoride copolymerized with at least one other monomer selected from the group consisting of halogenated ethylenes, halogenated propylenes and halogenated butylenes, said polymer having a distinct bimodal molecular weight distribution, as indicated by gel permeation chromatography, and a critical shear stress of at least 3 million dynes per square centimeter.

2. The vinylidene fluoride polymer resin of claim 1 wherein the polymer is a homopolymer.

3. The vinylidene fluoride polymer resin of claim 1 wherein the polymer is a copolymer.

4. The vinylidene fluoride polymer resin of claim 1 wherein the critical shear stress is at least 4 million dynes per square centimeter.

5. The vinylidene fluoride polymer of claim 2 wherein the critical shear stress is at least 4 million dynes per square centimeter.

6. The vinylidene fluoride polymer resin of claim 2 wherein the bimodal molecular weight distribution includes a high molecular weight spike of more than 30 up to about 70 percent of the total area under the gel permeation chromatography curve.

7. The vinylidene fluoride resin of claim 6 wherein the critical shear stress is at least 4 million dynes per square centimeter.

8. The vinylidene fluoride polymer resin of claim 1 which is crosslinked by radiation.

* * * * *